US011130857B2

(12) United States Patent
Sano et al.

(10) Patent No.: US 11,130,857 B2
(45) Date of Patent: Sep. 28, 2021

(54) EPOXY RESIN COMPOSITION, PREPREG, AND FIBER-REINFORCED COMPOSITE MATERIAL

(71) Applicant: Toray Industries, Inc., Tokyo (JP)

(72) Inventors: Kentaro Sano, Ehime (JP); Taiki Kuroda, Ehime (JP); Reo Takaiwa, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 307 days.

(21) Appl. No.: 16/310,562

(22) PCT Filed: Jun. 23, 2017

(86) PCT No.: PCT/JP2017/023190
§ 371 (c)(1),
(2) Date: Dec. 17, 2018

(87) PCT Pub. No.: WO2018/003691
PCT Pub. Date: Jan. 4, 2018

(65) Prior Publication Data
US 2019/0211201 A1    Jul. 11, 2019

(30) Foreign Application Priority Data

Jun. 28, 2016  (JP) .............................. JP2016-127269

(51) Int. Cl.
| | | |
|---|---|---|
| *C08L 63/00* | (2006.01) | |
| *C08J 5/24* | (2006.01) | |
| *C08K 5/16* | (2006.01) | |
| *C08L 63/04* | (2006.01) | |
| *C08K 5/3445* | (2006.01) | |
| *C08K 5/55* | (2006.01) | |
| *C08G 59/38* | (2006.01) | |

(52) U.S. Cl.
CPC .............. *C08L 63/00* (2013.01); *C08G 59/38* (2013.01); *C08J 5/24* (2013.01); *C08K 5/16* (2013.01); *C08K 5/3445* (2013.01); *C08K 5/55* (2013.01); *C08L 63/04* (2013.01); *C08J 2363/02* (2013.01); *C08J 2463/00* (2013.01); *C08J 2463/06* (2013.01); *C08L 2205/025* (2013.01); *C08L 2205/03* (2013.01)

(58) Field of Classification Search
CPC ...................................................... C08L 63/00
See application file for complete search history.

(56) References Cited

U.S. PATENT DOCUMENTS

| | | | |
|---|---|---|---|
| 2009/0215929 A1* | 8/2009 | Nishida .................... | C08J 5/043 523/468 |
| 2013/0217805 A1* | 8/2013 | Hayashi ................... | C08L 63/00 523/427 |
| 2017/0073481 A1 | 3/2017 | Nomura et al. | |

FOREIGN PATENT DOCUMENTS

| | | |
|---|---|---|
| JP | 1060084 A | 3/1998 |
| JP | 11209580 A | 8/1999 |
| JP | 2010270204 A | 12/2010 |
| JP | 2012111858 A | 6/2012 |
| JP | 2013133407 A | 7/2013 |
| JP | 2013253194 A | 12/2013 |
| JP | 2015101633 A | 6/2015 |
| JP | 2015189777 A | 11/2015 |
| JP | 2016053151 A | 4/2016 |
| WO | 2015186744 A1 | 12/2015 |

OTHER PUBLICATIONS

International Search Report and Written Opinion for International Application No. PCT/JP2017/023190, dated Aug. 1, 2017—6 pages.

* cited by examiner

*Primary Examiner* — Andrew T Piziali
(74) *Attorney, Agent, or Firm* — RatnerPrestia

(57) ABSTRACT

The present invention provides an epoxy resin composition that serves to produce a cured epoxy resin that simultaneously realizes a high heat resistance, a high elastic modulus, and a low color and to produce a molded article having a good appearance without suffering the formation of white spots on the surface thereof when used as matrix resin in a fiber reinforced composite material. The epoxy resin composition includes an epoxy resin as component [A], an aromatic urea [B1] and/or an imidazole compound [B2] as component [B], and a borate ester compound as component [C], containing dicyandiamide in the amount of 0.5 part by mass or less relative to the total quantity of epoxy resins which accounts for 100 parts by mass, wherein the epoxy resin composition meets certain sets of further requirements with respect to its composition.

10 Claims, No Drawings

EPOXY RESIN COMPOSITION, PREPREG, AND FIBER-REINFORCED COMPOSITE MATERIAL

CROSS REFERENCE TO RELATED APPLICATIONS

This is the U.S. National Phase application of PCT/JP2017/023190, filed Jun. 23, 2017, which claims priority to Japanese Patent Application No. 2016-127269, filed Jun. 28, 2016, the disclosures of these applications being incorporated herein by reference, in their entireties for all purposes.

FIELD OF THE INVENTION

The present invention relates to an epoxy resin composition adapted for use as matrix resin in a fiber reinforced composite material suitable for sport applications and general industry applications, and also relates to a prepreg and a fiber reinforced composite material prepared by using the epoxy resin composition as matrix resin.

BACKGROUND OF THE INVENTION

Epoxy resins have been widely used in various industries as coatings, adhesives, electric and electronic information materials, advanced composite materials, or the like because of their excellent mechanical properties. Epoxy resins have been frequently used particularly in fiber reinforced composite materials that are composed mainly of reinforcing fiber, such as carbon fiber, glass fiber, and aramid fiber, combined with matrix resin.

The use of a prepreg produced by impregnating a carbon fiber base with an epoxy resin is popular in the field of production of carbon fiber reinforced composite materials. Such a prepreg is laminated in layers or preformed, and then heated to cure the epoxy resin, thereby producing a molded article. If the curing reaction proceeds before the lamination step, the prepreg will suffer deterioration in handling property. Therefore, an epoxy resin to use in a prepreg requires high preservation stability, and dicyandiamide is widely as curing agent because it is high in latent curing property.

Being lightweight and having high strength and high stiffness, carbon fiber composite materials have been used in a variety of fields ranging from sport and leisure goods to industrial applications such as automobiles and aircraft. With this feature, they have been frequently used in recent years not only in structure members, but also for texture-of-cloth decoration realized by arranging woven fabrics in surfaces. For an epoxy resin adopted as matrix resin, therefore, importance is now attached to the low colors of cured products and appearance of molded articles in addition to high heat resistance and good mechanical properties of cured products. If dicyandiamide is used as curing agent, however, there occurs the problem of white spots being formed on the surface of the resulting molded article, leading to deterioration in the appearance thereof.

As a method to prevent the formation of white spots attributed to dicyandiamide, Patent document 1 discloses a technique designed to depress the formation of white spots in prepreg by adopting a masterbatch containing dicyandiamide particles with small diameters to allow the dicyandiamide and epoxy resin to be dissolved or compatibilized during the step for impregnating the base. As methods to eliminate the use of dicyandiamide, Patent document 2 discloses a technique that uses polythiol and a urea compound as curing agent components and Patent document 3 discloses a technique that employs an acid anhydride as curing agent.

PATENT DOCUMENTS

[Patent document 1] Japanese Unexamined Patent Publication (Kokai) No. HEI-11-209580
[Patent document 1] Japanese Unexamined, Patent Publication (Kokai) No. 2013-253194
[Patent document 3] Japanese Unexamined Patent Publication (Kokai) No. 2013-133407

SUMMARY OF THE INVENTION

In the case of the method described in Patent document 1, however, dicyandiamide is dissolved or compatibilized during the prepreg production step and as a result, the prepreg obtained fails to realize a sufficiently high preservation stability when used in a fiber reinforced composite material. In the case where dicyandiamide is not dissolved in the prepreg production step, the resulting molded articles occasionally suffer the formation of white spots on the surfaces thereof.

In the case of the method described in Patent document 2, the resulting molded articles do not suffer the formation of white spots on the surfaces thereof because dicyandiamide is not present, but the resulting cured resin products occasionally fail to have sufficiently high heat resistance or good mechanical properties.

In the case of using an acid anhydride curing agent as proposed in Patent document 3, the resulting molded articles are free of white spots on the surfaces thereof, but the acid anhydride used as the curing agent is occasionally degraded by the moisture in air, possibly leading to a cured resin product with deteriorated physical properties. Accordingly, it is not preferred to apply this method to the production of a prepreg for a fiber reinforced composite material that is expected to be stored for a certain period.

An object of the present invention is to eliminate the drawbacks of these conventional techniques to provide an epoxy resin composition that serves to produce a cured epoxy resin simultaneously realizing a high heat resistance, a high elastic modulus, and a low color and to produce a molded article having a good appearance without suffering the formation of white spots on the surface thereof when used as matrix resin in a fiber reinforced composite material, and also provide a prepreg produced from the epoxy resin composition, and a fiber reinforced composite material that is obtained by curing the prepreg and that suffers no white spots on the surface thereof and has a good appearance.

After making an intensive study aiming to solve the problems described above, the inventors of the present invention found an epoxy resin composition having the following constitution and arrived at the present invention on the basis of the finding. More specifically, the epoxy resin composition according to the present invention has the constitution described below.

An epoxy resin composition including an epoxy resin as component [A], an aromatic urea [B1] and/or an imidazole compound [B2] as component [B], and a borate ester compound as component [C], containing dicyandiamide in the amount of 0.5 part by mass or less relative to the total quantity of epoxy resins which accounts for 100 parts by mass, and meeting the requirement <i> or <ii> given below:
<i> meeting the condition (a), condition (b), and condition (c) given below, <ii> meeting the condition (d) and condition (e) given below,
(a) an isocyanurate type epoxy resin [A1] is contained as component [A] in an amount of 10 to 40 parts by mass relative to the total quantity of epoxy resins which represents 100 parts by mass,
(b) an bisphenol type epoxy resin [A2] is contained as component [A] in an amount of 40 to 90 parts by mass relative to the total quantity of epoxy resins which represents 100 parts by mass,
(c) resin [A2] has an average epoxy equivalent weight of 220 to 500 g/eq,
(d) an epoxy resin [A3] as represented by general formula (I) is contained as component [A] in an amount of 50 to 100 parts by mass relative to the total quantity of epoxy resins which represents 100 parts by mass,

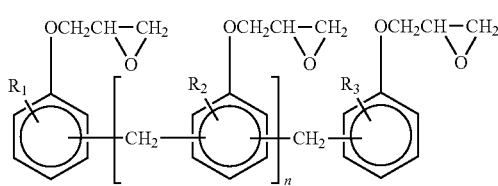

wherein $R_1$, $R_2$, and $R_3$ each are a hydrogen atom or a methyl group, and n is an integer of 1 or more, and
(e) the average epoxy equivalent weight over all epoxy resins is 165 to 265 g/eq.

The prepreg according to the present invention is a prepreg that includes the aforementioned epoxy resin composition and reinforcing fiber.

Furthermore, the fiber reinforced composite material according to the present invention is a fiber reinforced composite material that is obtainable by curing the aforementioned prepreg.

The present invention can provide an epoxy resin composition that serves to produce a cured epoxy resin realizing a high heat resistance, good mechanical properties and a low color and to produce a molded article having a good appearance without suffering the formation of white spots on the surface thereof when used as matrix resin in a fiber reinforced composite material.

DETAILED DESCRIPTION OF EMBODIMENTS OF THE INVENTION

It is necessary that the epoxy resin composition according to the present invention includes an epoxy resin as component [A], an aromatic urea [B1] and/or an imidazole compound [B2] as component [B], and a borate ester compound as component [C], contains dicyandiamide in the amount of 0.5 part by mass or less relative to the total quantity of epoxy resins which accounts for 100 parts by mass, and meets the requirement <i> or <ii> given below:
<i> meeting the condition (a), condition (b), and condition (c) given below,
<ii> meeting the condition (d) and condition (e) given below,
(a) an isocyanurate type epoxy resin [A1] is contained as component [A] in an amount of 10 to 40 parts by mass relative to the total quantity of epoxy resins which represents 100 parts by mass,
(b) an bisphenol type epoxy resin [A2] is contained as component [A] in an amount of 40 to 90 parts by mass relative to the total quantity of epoxy resins which represents 100 parts by mass,
(c) resin [A2] has an average epoxy equivalent weight of 220 to 500 g/eq, and
(d) an epoxy resin [A3] as represented by general formula (I) is contained as component [A] in an amount of 50 to 100 parts by mass relative to the total quantity of epoxy resins which represents 100 parts by mass.

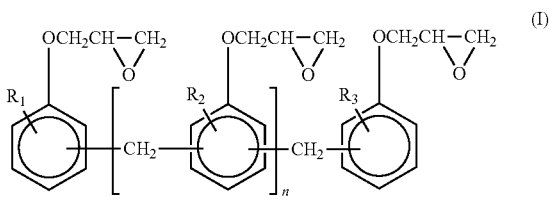

wherein $R_1$, $R_2$, and $R_3$ are each a hydrogen atom or a methyl group, and n is an integer of 1 or more, and
(e) the average epoxy equivalent weight over all epoxy resins is 165 to 265 g/eq.

First, these components are described below.
<Component [A]>
Component [A] for the present invention consists of epoxy resins. Examples thereof include glycidyl ether type epoxy resins such as biphenyl type epoxy resins, naphthalene type epoxy resins, novolac type epoxy resins, epoxy resins having fluorene backbones, epoxy resins formed from copolymers of a phenol compound and dicyclopentadiene, diglycidyl resorcinol, tetrakis(glycidyloxyphenyl)ethane, and tris(glycidyloxyphenyl)methane; and glycidylamine type epoxy resins such as tetraglycidyl diaminodiphenylmethane, triglycidyl aminophenol, triglycidyl aminocresol, and tetraglycidyl xylene diamine.
(Cases where Requirement <i> is Met)
For the present invention, it is necessary that an isocyanurate type epoxy resin [A1] is contained as component [A] in order to meet requirement <i>. As component [A1] is contained, it serves to produce a cured resin product having a high elastic modulus and also having an improved heat resistance, thus allowing the production of a fiber reinforced composite material having good mechanical properties and a high heat resistance.

It is essential for component [A1] to account for 10 to 40 parts by mass relative to the total quantity of epoxy resins, which accounts for 100 parts by mass, in the epoxy resin composition, and it is preferable that the lower limit is 15 parts by mass or more and that the upper limit is 30 parts by mass or less. As component [A1] is contained in an amount in this range, it serves to produce a cured resin product having a low color and also having an elastic modulus and a heat resistance in a good balance.

Examples of useful commercial products of component [A1] include TEPIC (registered trademark)-S, -L, -PAS B22 (all manufactured by Nissan Chemical Industries, Ltd.) and Araldite (registered trademark) PT9810 (manufactured by Huntsman Advanced Materials Gmbh).

For the present invention, it is necessary that a bisphenol type epoxy resin [A2] is contained as component [A] in order to meet requirement <i>. As resin [A2] is contained, it serves to produce a cured resin product having a decreased color and a fiber reinforced composite material having a good appearance.

It is essential for resin [A2] to account for 40 to 90 parts by mass relative to the total quantity of epoxy resins, which accounts for 100 parts by mass, in the epoxy resin composition, and it is preferable that the lower limit is 70 parts by mass or more and that the upper limit is 90 parts by mass or less. If resin [A2] is contained in an amount in this range, it serves to produce a cured resin product having a color and an elastic modulus in a good balance.

Examples of resin [A2] include epoxy resins produced by glycidyl-etherification of bisphenol compounds such as bisphenol A type epoxy resin, bisphenol F type epoxy resin, bisphenol AD type epoxy resin, and bisphenol S type epoxy resin.

Examples of useful commercial products of bisphenol A type epoxy resin include jER (registered trademark) 825, 828, 834, 1001, 1002, 1003, 1003F, 1004, 1004AF, 1005F, 1006FS, 1007, 1009, and 1010 (all manufactured by Mitsubishi Chemical Corporation).

Examples of useful commercial products of bisphenol F type epoxy resin include jER (registered trademark) 806, 807, 4002P, 4004P, 4007P, 4009P, and 4010P (all manufactured by Mitsubishi Chemical Corporation), Epotohto (registered trademark) YDF2001 and YDF2004 (both manufactured by Nippon Steel Chemical Co., Ltd.), and EPICRON (registered trademark) 830, 830-S, and 835 (all manufactured by DIC Corporation).

Examples of useful commercial products of bisphenol S type epoxy resin include EPICRON (registered trademark) EXA-1514 (manufactured by DIC Corporation).

In order to meet requirement <i> for the present invention, furthermore, it is essential for resin [A2] in the epoxy resin composition to have an average epoxy equivalent weight of 220 to 500 g/eq from the viewpoint of the balance between the heat resistance and the color of the cured epoxy resin and it is preferable that the lower limit is 300 g/eq or more and that the upper limit is 400 g/eq or less. If the average epoxy equivalent weight of resin [A2] is less than 220 g/eq, the resulting cured resin will have a decreased heat resistance and an increased color, possibly leading to a fiber reinforced composite material with a poor appearance. On the other hand, if the average epoxy equivalent weight of resin [A2] is more than 500 g/eq, the color will be low, but the resulting cured resin will have a decreased heat resistance.

The average epoxy equivalent weight of resin [A2] in the epoxy resin composition can be calculated by the method described below.

(Method for Calculation of the Average Epoxy Equivalent Weight of Resin [A2] in the Epoxy Resin Composition)

In the case of an epoxy resin composition containing a combination of n types of epoxy resins as resin [A2], with the epoxy resins in resin [A2] accounting for G' parts by mass in total and each epoxy resin X, which has an epoxy equivalent weight of Ex (g/eq), in resin [A2] accounting for Wx parts by mass, the average epoxy equivalent weight (g/eq) of resin [A2] can be calculated by Equation (I) (where x=1, 2, 3, . . . , n) given below.

$$\text{Average epoxy equivalent weight of resin } [A2] \text{ in epoxy resin composition (g/eq)} = \frac{G'}{\left[\left(\frac{W_1}{E_1}\right)+\left(\frac{W_2}{E_2}\right)\ldots+\left(\frac{W_x}{E_x}\right)\ldots+\left(\frac{W_n}{E_n}\right)\right]} \quad (I)$$

(Cases where Requirement <ii> is Met)

For the present invention, it is necessary that an epoxy resin [A3] as represented by general formula (I) is contained as component [A] in order to meet requirement <ii>.

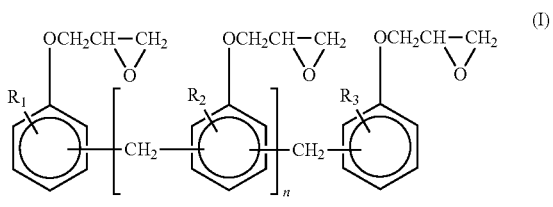

wherein $R_1$, $R_2$, and $R_3$ are each a hydrogen atom or a methyl group, and n is an integer of 1 or more.

As [A3] is contained, it serves to produce a cured resin having a high elastic modulus and also having an improved heat resistance, thus allowing the production of a fiber reinforced composite material having good mechanical properties and a high heat resistance.

In order to meet requirement <ii>, which is described below, for the present invention, furthermore, it is essential for [A3] to account for 50 to 100 parts by mass relative to the total quantity of epoxy resins, which accounts for 100 parts by mass, in the epoxy resin composition, and it is preferable that the lower limit is 60 parts by mass or more and that the upper limit is 90 parts by mass or less. As [A3] is contained in an amount in this range, it serves to produce a cured resin product having a low color and also having an elastic modulus and a heat resistance in a good balance.

Examples of [A3] include phenol novolac type epoxy resin and cresol novolac type epoxy resin.

Usable commercial products of phenol novolac type epoxy resin include jER (registered trademark) 152 and 154 (both manufactured by Mitsubishi Chemical Corporation) and EPPN-201 (manufactured by Nippon Kayaku Co., Ltd.).

Usable commercial products of cresol novolac-type epoxy resin include EPICRON (registered trademark) N-660, N-665, N-670, N-673, N-680, N-690, and N-695 (all manufactured by DIC Corporation), and EOCN-102S, EOCN-103S, and EOCN-104S (all manufactured by Nippon Kayaku Co., Ltd.).

In order to meet requirement <ii> for the present invention, furthermore, it is necessary that the average epoxy equivalent weight over all epoxy resins in the epoxy resin composition is 165 to 265 g/eq in order to realize a good balance between heat resistance and color of the cured epoxy resin and it is preferable that the lower limit is 180 g/eq or more and that the upper limit is 250 g/eq or less. If the average epoxy equivalent weight over all epoxy resins is less than 165 g/eq, the resulting cured resin will have a decreased heat resistance and an increased color, possibly leading to a fiber reinforced composite material with a poor appearance. On the other hand, if the average epoxy equivalent weight over all epoxy resins is more than 265 g/eq, the color will be low, but the resulting cured resin will have a decreased heat resistance.

The average epoxy equivalent weight over all epoxy resins in the epoxy resin composition can be calculated by the method described below.

(Method for Calculation of Average Epoxy Equivalent Weight Over all Epoxy Resins in Epoxy Resin Composition)

In the case of an epoxy resin composition containing a combination of n types of epoxy resins as component [A], with the epoxy resins accounting for G parts by mass in total and each epoxy resin Y, which has an epoxy equivalent weight of Ey (g/eq), accounting for Wy parts by mass, the average epoxy equivalent weight (g/eq) over all epoxy resins can be calculated by Equation (II) (where y=1, 2, 3, . . . , n) given below.

Average epoxy equivalent weight over all epoxy resins in epoxy resin composition (g/eq) =

$$\frac{G}{\left[\left(\frac{W_1}{E_1}\right)+\left(\frac{W_2}{E_2}\right)\ldots+\left(\frac{W_y}{E_y}\right)\ldots+\left(\frac{W_n}{E_n}\right)\right]} \quad (II)$$

<Component [B]>

For the present invention, component [B] consists of an aromatic urea [B1] and/or an imidazole compound [B2]. For the present invention, component [B] works as a curing agent to promote the self-polymerization of the epoxy resins in component [A]. The use of component [B] serves to produce a cured epoxy resin having a low color and a good balance with heat resistance in comparison with other self-polymerization type curing agents.

For the present invention, there exist preferred ranges for the contents of components [B1] and [B2] from the viewpoint of the balance between the heat resistance and color of the resulting cured epoxy resin.

In the case where substantially only [B1] is contained as component [B], it is preferable for [B1] to account for 2.5 to 7.5 parts by mass relative to the total quantity of epoxy resins, which accounts for 100 parts by mass, in the epoxy resin composition, and it is more preferable that the lower limit is 3 parts by mass or more and that the upper limit is 7 parts by mass or less. The cured resin will have a decreased heat resistance if the content of [B1] is less than 2.5 parts by mass, whereas the cured resin will have an increased color, leading to a fiber reinforced composite material with a deteriorated appearance, if it is more than 7.5 parts by mass.

If both [B1] and [B2] are contained as component [B], it is preferable that [B1] and [B2] account for 0.5 to 5 parts by mass and 0.5 to 5 parts by mass, respectively, relative to the total quantity of epoxy resins, which accounts for 100 parts by mass, in the epoxy resin composition and that the total content of [B1] and [B2] is 2.5 to 7.5 parts by mass. For [B1], furthermore, it is more preferable that the lower limit is 1 part by mass or more whereas the upper limit is 4 parts by mass or less, and for [B2], it is more preferable that the lower limit is 1 part by mass or more whereas the upper limit is 4 parts by mass or less. It is also more preferable that the lower limit of the total content of [B1] and [B2] is 3 parts by mass or more whereas the upper limit thereof is 7 parts by mass or less. The cured resin will have a decreased heat resistance if the total content of [B1] and [B2] is less than 2.5 parts by mass, whereas the cured resin will have an increased color, leading to a fiber reinforced composite material with a deteriorated appearance, if it is more than 7.5 parts by mass.

Examples of aromatic urea [B1] include 3-(3,4-dichlorophenyl)-1,1-dimethylurea, 3-(4-chlorophenyl)-1,1-dimethylurea, phenyl-dimethylurea, and toluene bisdimethylurea. Commercially available products of aromatic urea include DCMU99 (manufactured by Hodogaya Chemical Co., Ltd.) and Omicure (registered trademark) 24 (manufactured by PTI Japan).

Examples of imidazole compound [B2] include 1-benzyl-2-methyl imidazole, 1-benzyl-2-ethyl imidazole, 1-cyanoethyl-2-methyl imidazole, 1-cyanoethyl-2-ethyl-4-methyl imidazole, and 1-cyanoethyl-2-phenyl imidazole. These imidazole compounds may be used singly or as a combination of two or more thereof.

It is also preferable that a compound as represented by the undermentioned general formula (II) is contained as [B2].

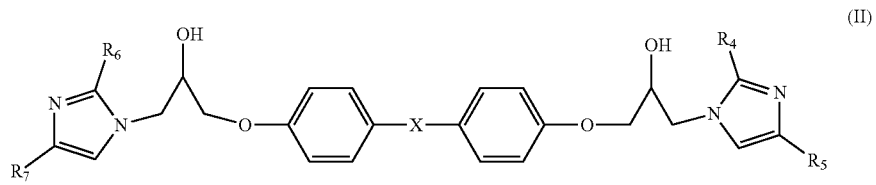

(II)

(In the formula, $R_4$, $R_5$, $R_6$, and $R_7$ are each independently a hydrogen atom, an aliphatic hydrocarbon group with a carbon number of 1 to 20, or a phenyl group, and X is a single bond, an alkylene group, an alkylidene group, an ether group, or a sulfonyl group.)

If such a compound as represented by general formula (II) is used, it will tend to result in a cured epoxy resin with a reduced color and an improved heat resistance, making it possible to easily produce a fiber reinforced composite material having a good appearance and a high heat resistance.

A compound as represented by general formula (II) is an addition product obtainable through a reaction between an imidazole compound and an epoxy compound. Commercial products of the addition product include Cureduct (registered trademark) P-0505 (Shikoku Chemicals Corporation) and JER cure (registered trademark) P200H50 (Mitsubishi Chemical Corporation).

For the present invention, the incorporation of a dicyandiamide as curing agent may result in a molded article suffering the formation of white spots on the surface thereof to deteriorate the appearance. For the present invention, therefore, it is necessary for the dicyandiamide to account for 0.5 part by mass or less, more preferably 0.2 part by mass or less, relative to the total quantity of epoxy resins, which accounts for 100 parts by mass, and it is most preferable that dicyandiamide is not contained.

<Component [C]>

It is essential for the epoxy resin composition according to the present invention to contain a borate ester compound as component [C]. For the present invention, the borate ester compound of component [C] works as a stabilization agent for the aromatic urea and/or imidazole compound of component [B]. The incorporation of a borate ester compound is desirable because it serves to produce an epoxy resin composition and a prepreg having an improved preservation stability.

Examples of the boric ester compound include alkyl borates such as trimethyl borate, triethyl borate, tributyl borate, tri-n-octyl borate, tri(triethylene glycol methyl ether) borate, tricyclohexyl borate, and trimenthyl borate; aromatic borate esters such as tri-o-cresyl borate, tri-m-cresyl borate, tri-p-cresyl borate, and triphenyl borate; and others such as tri(1,3-butanediol) biborate, tri(2-methyl-2,4-pentanediol) biborate, and trioctylene glycol diborate.

The borate ester compound to use may also be a cyclic borate ester compound having a cyclic structure in its molecule. Examples of the cyclic borate ester include tris-o-phenylene bisborate, bis-o-phenylene pyroborate, bis-2,3-dimethylethylene pyroborate, and bis-2,2-dimethyltrimethylene pyroborate.

Commercial products that contain such borate ester compounds include Cureduct (registered trademark) L-01B and L-07N (both manufactured by Shikoku Chemicals Corporation).

<Method for Preparation of Epoxy Resin Composition>

To prepare the epoxy resin composition according to the present invention, a mixture of materials may be kneaded by using a machine such as kneader, planetary mixer, three roll mill, and twin screw extruder, or a mixture may be manually produced by using, for example, a beaker and a spatula if uniform kneading is possible. Preferred preparation methods include the following. Specifically, component [A] is put in a container and heated while stirring to an appropriate temperature in the range of 130° C. to 180° C. to ensure uniform dissolution of the epoxy resin. Subsequently, it is cooled while stirring preferably to a temperature of 100° C. or less, more preferably 80° C. or less, and still more preferably 60° C. or less, and component [B] and component [C] are fed, followed by kneading. In this instance, it is more preferred to prepare in advance a curing agent masterbatch using part of component [A] in order to ensure uniform mixing of component [B] and component [C].

<Fiber Reinforced Composite Material>

Next, details of the fiber reinforced composite material are described below. A fiber reinforced composite material containing a cured product of the epoxy resin composition according to the present invention as matrix resin can be produced by blending and integrating the epoxy resin composition according to the present invention with reinforcing fiber, followed by curing the blend.

There are no specific limitations on the reinforcing fiber to be used for the present invention, and useful examples include glass fiber, carbon fiber, aramid fiber, boron fiber, alumina fiber, and silicon carbide fiber. A plurality of these fibers may be used as a mixture. Of these, the use of carbon fiber is preferred because it serves to provide a fiber reinforced composite material that is light in weight and high in stiffness and a molded article containing glossy black fibers and having good design characteristics.

The white spots on the surface of a molded article that occur when dicyandiamide is used as curing agent, which constitute the major problem of the present invention, are considered to result from the filtering of dicyandiamide by fibers during the impregnation with the epoxy resin composition or the segregation of dicyandiamide in the neighborhood of fibers as the resin flows during the molding step. When dicyandiamide is used as curing agent, the advantageous effect of the invention is enhanced more greatly with a decreasing single fiber diameter of the reinforcing fiber that is combined with the fiber reinforced composite material because fibers with a smaller single fiber diameter tend to suffer more white spots. From this viewpoint, it is preferable for the reinforcing fiber to have a single fiber diameter of 3 to 20 µm, more preferably 3 to 10 µm. A single fiber diameter controlled in this range ensures the enhancement of the effect of the invention.

<Prepreg>

When producing a fiber reinforced composite material, it is preferable to preliminarily produce a prepreg composed mainly of an epoxy resin composition and reinforcing fiber in order to ensure easy storage and high handleability. Such a prepreg can be obtained by impregnating reinforcing fiber with the epoxy resin composition according to the present invention. Good techniques for the impregnation include hot melting (dry method).

Hot melting is a technique designed for direct impregnation of reinforcing fiber with an epoxy resin composition that is preliminarily heated to decrease its viscosity. Specifically, a film coated with an epoxy resin composition is first prepared on a piece of release paper or the like, and then the film is put on a sheet of paralleled reinforcing fibers or a sheet (cloth) of woven fabric reinforcing fibers from both sides or from one side thereof, and heated and pressed to ensure impregnation of the reinforcing fiber with the resin.

There are no specific limitations on the structural features of the reinforcing fiber to use for producing the prepreg, but it is preferred to use woven fabrics because they serve to produce molded articles with uncontaminated intersections of fibers and good design characteristics. In the case where dicyandiamide is used as curing agent, white spots tend to be generated in the neighborhood of intersections of fibers as a woven fabric type prepreg is molded. The advantageous effect of the invention is enhanced particularly greatly when woven fabric is used as reinforcing fiber in a prepreg.

Here, there are no specific limitations on the reinforcing fiber to use in a prepreg, and the various fibers listed above in the description of fiber reinforced composite materials can be adopted. Among others, the use of carbon fiber is preferred because it serves to provide a fiber reinforced composite material that is light in weight and high in stiffness and a molded article containing glossy black fibers and having good design characteristics.

<Method for Molding of Prepreg>

For laminate molding of prepreg layers, techniques that can be useful for applying heat and pressure include press molding, autoclave molding, bucking molding, wrapping tape molding, and internal pressure molding.

Fiber reinforced composite materials containing a cured product of the epoxy resin composition according to the present invention and reinforcing fiber are adopted favorably in sports applications, general industrial applications, and aerospace applications. More specifically, preferred sports applications include golf shafts, fishing rods, tennis and badminton rackets, hockey and other sticks, and skiing poles. Furthermore, preferred general industrial applications include structural and interior finishing material of vehicles (such as automobiles, motorcycles, bicycles, ships, and railroad vehicles), drive shafts, plate springs, windmill blades, pressure vessels, flywheels, rollers for paper manufacture, roofing materials, cables, and mending/reinforcing materials.

EXAMPLES

The present invention is described below in more detail with reference to Examples, but it should be understood that the invention is not construed as being limited thereto.

Determination of physical properties was performed in an environment with a temperature of 23° C. and a relative humidity of 50% unless otherwise specified.

The materials listed below were used for the preparation of various epoxy resin compositions.

<Materials Used>
Component [A]: epoxy resin
isocyanurate type epoxy resin [A1]
[A1]-1 TEPIC (registered trademark)-S (epoxy equivalent weight 100, manufactured by Nissan Chemical Industries, Ltd.)
[A1]-2 TEPIC (registered trademark)-L (epoxy equivalent weight 101, manufactured by Nissan Chemical Industries, Ltd.)
[A1]-3 TEPIC (registered trademark)-PAS B22 (epoxy equivalent weight 190, manufactured by Nissan Chemical Industries, Ltd.)
bisphenol type epoxy resin [A2]
[A2]-1 EPICLON (registered trademark) 830 (bisphenol F type epoxy resin, epoxy equivalent weight 172, manufactured by DIC Corporation)
[A2]-2 jER (registered trademark) 828 (bisphenol A type epoxy resin, epoxy equivalent weight 189, manufactured by Mitsubishi Chemical Corporation)
[A2]-3 Epotohto (registered trademark) YDF-2001 (bisphenol F type epoxy resin, epoxy equivalent weight 475, manufactured by Tohto Kasei Co., Ltd.).
[A2]-4 jER (registered trademark) 1001 (bisphenol A type epoxy resin, epoxy equivalent weight 470, manufactured by Mitsubishi Chemical Corporation)
[A2]-5 jER (registered trademark) 4004P (bisphenol F type epoxy resin, epoxy equivalent weight 910, manufactured by Mitsubishi Chemical Corporation)
[A2]-6 jER (registered trademark) 1007 (bisphenol A type epoxy resin, epoxy equivalent weight 910, manufactured by Mitsubishi Chemical Corporation)
epoxy resin [A3] as represented by general formula (I)
[A3]-1 jER (registered trademark) 154 (phenol novolac type epoxy resin, epoxy equivalent weight 175, a compound as represented by general formula (I) wherein $R_1$, $R_2$, and $R_3$ are each a hydrogen atom, manufactured by Mitsubishi Chemical Corporation)
other epoxy resins [A4]
[A4]-1 SUMI-EPDXY (registered trademark) ELM434 (diaminodiphenylmethane type epoxy resin, epoxy equivalent weight 120, manufactured by Sumitomo Chemical Co., Ltd.)
Component [B]: aromatic urea and/or imidazole compound
aromatic urea [B1]
[B1]-1 DCMU99 (3-(3,4-dichlorophenyl)-1,1-dimethylurea, manufactured by Hodogaya Chemical Co., Ltd.)
[B1]-2 Omicure (registered trademark) 24 (4,4'-methylene-bis(phenyldimethylurea, manufactured by PTI Japan)
imidazole compound [B2]
[B2]-1 Curezol (registered trademark) 2PZ (imidazole equivalent weight 144, 2-phenyl imidazole, manufactured by Shikoku Chemicals Corporation)
[B2]-2 Cureduct (registered trademark) P-0505 (imidazole equivalent weight 280; a compound as represented by general formula (II) wherein $R_4$ and $R_5$ are each an ethyl group; $R_6$ and $R_7$ are each a methyl group; and X is isopropylidene group; manufactured by Shikoku Chemicals Corporation)
Other curing agents [B']
[B']-1 jER Cure (registered trademark) DICY7 (dicyandiamide, manufactured by Mitsubishi Chemical Corporation)
Component [C]: borate ester compound
a mixture containing a borate ester compound of Component [C]
[C]-1 Cureduct (registered trademark) L-07N (a mixture containing 5 parts by mass of a borate ester compound as acidic compound, manufactured by Shikoku Chemicals Corporation)

<Methods for Calculation of Parameters of Resin Composition>

(1) Method for Calculation of Average Epoxy Equivalent Weight of Resin [A2] in Epoxy Resin Composition In the case of an epoxy resin composition containing n types of epoxy resins in combination as resin [A2], with the epoxy resins in resin [A2] accounting for G' parts by mass in total and each epoxy resin X, which has an epoxy equivalent weight of Ex (g/eq), in resin [A2] accounting for Wx parts by mass, the average epoxy equivalent weight (g/eq) of resin [A2] was calculated by Equation (I) (where x=1, 2, 3, . . . , n) given below.

[Formula 3]

$$\text{Average epoxy equivalent weight of resin } [A2] \text{ in epoxy resin composition } (g/eq) = \frac{G'}{\left[\left(\frac{W_1}{E_1}\right) + \left(\frac{W_2}{E_2}\right) \ldots + \left(\frac{W_x}{E_x}\right) \ldots + \left(\frac{W_n}{E_n}\right)\right]} \quad (I)$$

(2) Average epoxy equivalent weight over all epoxy resins in an epoxy resin composition (g/eq) In the case of an epoxy resin composition containing a combination of n types of epoxy resins as component [A] and also containing epoxy resins accounting for G parts by mass in total, with each epoxy resin Y, which has an epoxy equivalent weight of Ey (g/eq), accounting for Wy parts by mass, the average epoxy equivalent weight (g/eq) over all epoxy resins is calculated by Equation (II) (where y=1, 2, 3, . . . , n) given below.

[Formula 4]

$$\text{Average epoxy equivalent weight over all epoxy resins in epoxy resin composition } (g/eq) = \frac{G}{\left[\left(\frac{W_1}{E_1}\right) + \left(\frac{W_2}{E_2}\right) \ldots + \left(\frac{W_y}{E_y}\right) \ldots + \left(\frac{W_n}{E_n}\right)\right]} \quad (II)$$

<Method for Preparation of Epoxy Resin Composition>
(1) Preparation of Curing Agent Masterbatch A liquid-state epoxy resin ([A2]-1, [A2]-2, and/or [A3]-1 to be contained in the resin composition) was prepared in an amount of 10 parts by mass (accounting for 10 parts by mass relative to the total quantity of epoxy resins in component [A], which accounts for 100 parts by mass). To this, an aromatic urea and/or imidazole compound of component [B], other curing agent [B'], and/or a borate ester compound of component [C] that are to be contained in the resin composition are added and kneaded in a kneader at room temperature. The resulting mixture was passed through a three roll mill twice to prepare a curing agent masterbatch.

(2) Preparation of Epoxy Resin Composition

Excluding the 10 parts by mass of the liquid-state epoxy resin used in paragraph (1) above, 90 parts by mass of the epoxy resin of component [A] is put in a kneader. While kneading, the temperature was raised to 150° C. and it was maintained for 1 hour to provide a transparent viscous liquid. After cooling the liquid to 60° C. while continuing to knead it, the curing agent masterbatch prepared in paragraph (1) above was added, followed by kneading at the temperature for 30 minutes to prepare an epoxy resin composition. Tables 1 to 5 show the components of the epoxy resin compositions prepared in each Example and Comparative example.

<Method for Production of Cured Epoxy Resin>

An epoxy resin composition prepared according to the <Method for preparation of epoxy resin compositions> described above was defoamed in a vacuum and cured at a temperature of 130° C. for 90 minutes in a mold set for a thickness of 2 mm using a 2 mm thick spacer of Teflon (registered trademark), thus providing a cured epoxy resin plate with a thickness of 2 mm.

<Method for Production of Woven Fabric Carbon Fiber Reinforced Composite Material (Hereinafter, Woven Fabric CFRP)>

An epoxy resin composition prepared according to the <Method for preparation of epoxy resin composition> described above was spread on a piece of release paper using a film coater to produce a resin film having a metsuke of 66 g/m². A piece of two-directional carbon fiber cloth (2/2 twill weave, metsuke 198 g/m²) (Torayca (registered trademark) T300, manufactured by Toray Industries, Inc.) was sandwiched between two sheets of resin film and heat-compressed in a prepregging apparatus to ensure impregnation from both sides to provide a woven fabric prepreg. The resin accounted for 40 mass % of the prepreg.

Ten plies of this woven fabric prepreg were laid up with their fibers aligned in the same direction, covered with a nylon film in a gapless manner, and subjected to heat-compression molding in an autoclave at 130° C. for 2 hours under an internal pressure of 0.3 MPa to ensure curing to prepare a woven fabric CFRP.

<Methods for Evaluation of Physical Properties>

(1) Preservation Stability of Epoxy Resin Composition

The preservation stability of an epoxy resin composition is evaluated in terms of the variation in Tg that is determined as described below. In a container having a round bottom with a diameter of 4 cm, 2 g of an epoxy resin composition prepared according to the <Method for preparation of epoxy resin composition> described above was fixed and it was stored for 7 days in a constant temperature and humidity tank placed in an environment with a temperature of 25° C. and a relative humidity of 50% RH. A 3 mg sample of the resin was weighed on a pan before and after the storage and measurements were taken using a differential scanning colorimeter (Q-2000, manufactured by TA Instrument) while increasing the temperature from −50° C. to 100° C. at a constant heating rate of 10° C./minute. The midpoint in the inflection section of the resulting heat-temperature curve was taken as the glass transition temperature (hereinafter denoted as Tg). The Tg variation was calculated by subtracting the Tg value measured before the storage from the Tg value measured after the storage. A smaller Tg variation shows a better preservation stability.

(2) Tg of Cured Epoxy Resin

A test piece with a width of 10 mm, a length of 40 mm, and a thickness of 2 mm was cut out of a cured epoxy resin sample prepared according to the <Method for production of cured epoxy resin> described above and subjected to measurement by a dynamic viscoelasticity measuring apparatus (DMA-Q800, manufactured by TA Instruments) under the conditions of a deformation mode of cantilever bending, a span of 18 mm, a strain of 20 μm, a frequency of 1 Hz, and a constant temperature raising rate of 5° C./min for heating from 40° C. to 200° C. Tg was determined as the onset temperature of storage elastic modulus in the resulting storage elastic modulus-temperature curve.

(3) Elastic Modulus of Cured Epoxy Resin

A test piece having a width of 10 mm and a length of 60 mm was cut out of a cured resin sample prepared according to the <Method for production of cured epoxy resin> described above and subjected to three-point bending test using an Instron type universal tester (manufactured by Instron Corporation) with a span of 32 mm and a crosshead speed of 100 mm/minute according to JIS K7171 (1994) to measure the elastic modulus. Measurements were taken from 6 specimens (n=6) and the average was adopted as their elastic modulus.

(4) Yellowness Index of Cured Epoxy Resin

A 3 cm×3 cm test piece with a thickness of 2 mm was cut out of a cured epoxy resin sample prepared according to the <Method for production of cured epoxy resin> described above. This test piece was subjected to measurement of the color of transmitting objects using a spectrophotometer (MSC-P, manufactured by Suga Test Instruments Co., Ltd.) according to JIS Z8722 (2009) to determine the tristimulus values. A D65 Illuminant was used under the geometrical condition of e, and measurements were taken by spectrophotometric colorimetry with an effective wavelength width of 5 nm and wavelength intervals of 5 nm. The color system used was the XYZ color system. Based on the tristimulus values thus obtained, the yellowness index was calculated according to JIS K7373 (2006).

(5) Appearance of Woven Fabric CFRP

Woven fabric CFRP was prepared according to the <Method for production of woven fabric CFRP> described above and immersed in 40° C. water for 7 days. After the immersion, the appearance of the woven fabric CFRP was observed visually focusing on the portions around intersections of fibers. A specimen was rated as good when no white spots were found and rated as poor when white spots were found.

Example 1

An epoxy resin composition was prepared according to the <Method for preparation of epoxy resin composition> described above using 20 parts by mass of TEPIC (registered trademark)-L, 25 parts by mass of jER (registered trademark) 828, and 55 parts by mass of Epotohto (registered trademark) YDF2001 as the epoxy resins of component [A], 4 parts by mass of Omicure (registered trademark) 24 as aromatic urea [B1], and 3 parts by mass of Cureduct (registered trademark) L-07N as the mixture containing a borate ester compound of component [C].

For this epoxy resin composition, the Tg variation was measured and found to be +4° C., which shows a high preservation stability.

From the epoxy resin composition obtained, cured epoxy resin was prepared according to the <Method for production of cured epoxy resin>. The Tg, flexural modulus, and yellowness index of this cured epoxy resin were measured and results showed a Tg of 136° C., a flexural modulus of 3.5 GPa, and a yellowness index of 52, which suggest that the cured resin had good physical properties. Then, woven fabric CFRP was prepared from the epoxy resin composition obtained and its appearance was observed. The observation showed no white spots.

Examples 2 to 23

Except for using the resin components that are shown in Tables 1, 2 and 3, the same procedure as in Example 1 was carried out to prepare epoxy resin compositions, cured epoxy resins, and woven fabric CFRPs.

The preservation stability of the epoxy resin composition, the Tg, elastic modulus, and yellowness index of the cured epoxy resins, and the appearance of the woven fabric CFRP determined in each Example are given in Tables 1, 2 and 3, showing that good results were obtained for all of them.

Comparative Example 1

An epoxy resin composition, cured epoxy resin, and woven fabric CFRP were prepared by the same procedure as in Example 1 using the resin components given in Table 4. Evaluation results are also shown in Table 4. Good results were obtained for the preservation stability of the epoxy resin composition, the Tg and elastic modulus of the cured epoxy resins, and the appearance of the woven fabric CFRP. However, the content of [A2] was less than 40 parts by mass relative to the total quantity of epoxy resins which represented 100 parts by mass, and accordingly, condition (b) was not met although the overall constitution nearly met requirement <i>, resulting in a cured epoxy resin with a less desirable yellowness index compared to Example 1.

Comparative Example 2

An epoxy resin composition, cured epoxy resin, and woven fabric CFRP were prepared by the same procedure as in Example 1 using the resin components given in Table 4. Evaluation results are also shown in Table 4. Good results were obtained for the Tg and elastic modulus of the cured epoxy resin and the appearance of the woven fabric CFRP, but the epoxy resin composition had a lower preservation stability compared to Comparative example 1. In addition, the content of [A2] was less than 40 parts by mass relative to the total quantity of epoxy resins which represented 100 parts by mass, and accordingly, condition (b) was not met although the overall constitution nearly met requirement <i>, resulting in a cured epoxy resin with a less desirable yellowness index compared to Example 1.

Comparative Example 3

An epoxy resin composition, cured epoxy resin, and woven fabric CFRP were prepared by the same procedure as in Example 1 using the resin components given in Table 4. Evaluation results are also shown in Table 4. Good results were obtained for the preservation stability of the epoxy resin composition, the Tg and yellowness index of the cured epoxy resins, and the appearance of the woven fabric CFRP. However, the content of [A1] was less than 10 parts by mass relative to the total quantity of epoxy resins which represented 100 parts by mass, and accordingly, condition (a) was not met although the overall constitution nearly met requirement <i>, resulting in a cured epoxy resin with a smaller elastic modulus compared to Example 1.

Comparative Example 4

An epoxy resin composition, cured epoxy resin, and woven fabric CFRP were prepared by the same procedure as in Example 1 using the resin components given in Table 4. Evaluation results are also shown in Table 4. Good results were obtained for the preservation stability of the epoxy resin composition, the Tg and yellowness index of the cured epoxy resins, and the appearance of the woven fabric CFRP. However, the content of [A1] was less than 10 parts by mass relative to the total quantity of epoxy resins which represented 100 parts by mass, and accordingly, condition (a) was not met although the overall constitution nearly met requirement <i>, resulting in a cured epoxy resin with a smaller elastic modulus compared to Example 1.

Comparative Example 5

An epoxy resin composition, cured epoxy resin, and woven fabric CFRP were prepared by the same procedure as in Example 1 using the resin components given in Table 4. Evaluation results are also shown in Table 4. Good results were obtained for the preservation stability of the epoxy resin composition, the Tg of the cured epoxy resins, and the appearance of the woven fabric CFRP, but the yellowness index had an undesirable value. In addition, the content of [A1] was less than 10 parts by mass relative to the total quantity of epoxy resins which represented 100 parts by mass, and accordingly, condition (a) was not met although the overall constitution nearly met requirement <i>, resulting in a cured epoxy resin with a smaller elastic modulus compared to Example 1.

Comparative Example 6

An epoxy resin composition, cured epoxy resin, and woven fabric CFRP were prepared by the same procedure as in Example 1 using the resin components given in Table 4. Evaluation results are also shown in Table 4. Good results were obtained for the preservation stability of the epoxy resin composition, the Tg and elastic modulus of the cured epoxy resins, and the appearance of the woven fabric CFRP. However, the content of [A1] was more than 40 parts by mass relative to the total quantity of epoxy resins which represented 100 parts by mass, and accordingly, condition (a) was not met although the overall constitution nearly met requirement <i>, resulting in a cured epoxy resin with a less desirable yellowness index compared to Example 9.

Comparative Example 7

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition, the elastic modulus and yellowness index of the cured epoxy resins, and the appearance of the woven fabric CFRP. However, the average epoxy equivalent weight of [A2] was less than 220 g/eq, and accordingly, condition (c) was not met although the overall constitution nearly met requirement <i>, resulting in a cured epoxy resin with a lower Tg compared to Example 1.

Comparative Example 8

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition, the elastic modulus and yellowness index of the cured epoxy resins, and the appearance of the woven fabric CFRP. However, the average epoxy equivalent weight of [A2] was more than 500 g/eq, and accordingly, condition (c) was not met although the overall constitution nearly met requirement <i>, resulting in a cured epoxy resin with a lower Tg compared to Example 1.

Comparative Example 9

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition, the Tg and yellowness index of the cured epoxy resins, and the appearance of the woven fabric CFRP. However, the content of [A3] was small, and accordingly, condition (d) was not met although the overall constitution nearly met requirement <ii>, resulting in a cured epoxy resin with a smaller elastic modulus compared to Example 3.

Comparative Example 10

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition, the elastic modulus of the cured epoxy resins, and the appearance of the woven fabric CFRP. However, the average epoxy equivalent weight over all epoxy resins was less than 165 g/eq, and accordingly, condition (e) was not met although the overall constitution nearly met requirement <ii>, resulting in a cured epoxy resin with an undesirable Tg and an undesirable yellowness index compared to Example 3.

Comparative Example 11

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition, the elastic modulus and yellowness index of the cured epoxy resins, and the appearance of the woven fabric CFRP. However, the average epoxy equivalent weight over all epoxy resins was more than 265 g/eq, and accordingly, condition (e) was not met although the overall constitution nearly met requirement <ii>, resulting in a cured epoxy resin with an undesirable Tg compared to Example 3.

Comparative Example 12

An epoxy resin composition, cured epoxy resin, and woven fabric CFRP were prepared by the same procedure as in Example 1 using the resin components given in Table 5. Evaluation results are also shown in Table 5. Good results were obtained for the preservation stability of the epoxy resin composition and the Tg, elastic modulus, and yellowness index of the cured epoxy resin, but dicyandiamide was contained, resulting in white spots being found in the woven fabric CFRP.

Comparative Example 13

An epoxy resin composition, cured epoxy resin, and woven fabric CFRP were prepared by the same procedure as in Example 1 using the resin components given in Table 5. Evaluation results are also shown in Table 5. Since component [C] was not contained, the epoxy resin composition had a lower preservation stability compared to Example 3.

TABLE 1

| | Components | | | Example 1 | Example 2 | Example 3 | Example 4 | Example 5 |
|---|---|---|---|---|---|---|---|---|
| Epoxy resin composition (parts by mass) | [A] epoxy resin | [A1] isocyanurate type epoxy resin | TEPIC ®-S | | | | | |
| | | | TEPIC ®-L | 20 | 20 | | | |
| | | | TEPIC ®-PAS B22 | | | | | |
| | | [A2] bisphenol type epoxy resin | EPICLON ® 830 | | | | | |
| | | | jER ® 828 | 25 | 25 | | | |
| | | | Epotohto ® YDF2001 | 55 | 55 | 30 | 30 | 10 |
| | | | jER ® 1001 | | | | | |
| | | | jER ® 4004P | | | | | |
| | | | jER ® 1007 | | | | | |
| | | [A3] epoxy resin as represented by general formula (I) | jER ® 154 | | | 70 | 70 | 90 |
| | [B] aromatic urea and/or imidazole compound | [B1] aromatic urea | DCMU99 | | 3 | | 3 | 3 |
| | | | Omicure 24 | 4 | | 4 | | |
| | | [B2] imidazole compound | Curezol ® 2PZ | | | | | |
| | | | Cureduct ® P-0505 | | 3 | | 3 | 3 |
| | [C] mixture containing borate ester compound | | Cureduct ® L-07N | 3 | 3 | 3 | 3 | 3 |
| Resin composition parameter | average epoxy equivalent weight over all epoxy resins g · eq$^{-1}$ | | | 224 | 224 | 219 | 219 | 190 |
| | average epoxy equivalent weight of [A2] g · eq$^{-1}$ | | | 322 | 322 | 475 | 475 | 475 |
| Physical properties evaluation results | epoxy resin composition | preservation stability (Tg variation ° C.) | | 4 | 4 | 4 | 4 | 4 |
| | cured epoxy resin | Tg ° C. | | 136 | 144 | 130 | 141 | 146 |
| | | elastic modulus GPa | | 3.5 | 3.5 | 3.6 | 3.6 | 3.6 |
| | | yellowness index | | 52 | 63 | 68 | 60 | 78 |
| | woven fabric CFRP | appearance (white spot absent: good, white spot existent: poor) | | good | good | good | good | good |

TABLE 1-continued

| | | Components | | Example 6 | Example 7 | Example 8 | Example 9 |
|---|---|---|---|---|---|---|---|
| Epoxy resin composition (parts by mass) | [A] epoxy resin | [A1] isocyanurate type epoxy resin | TEPIC ®-S | | | | |
| | | | TEPIC ®-L | 20 | 10 | 25 | 40 |
| | | | TEPIC ®-PAS B22 | | | | |
| | | [A2] bisphenol type epoxy resin | EPICLON ® 830 | | 20 | 20 | 20 |
| | | | jER ® 828 | 15 | | | |
| | | | Epotohto ® YDF2001 | 30 | | | |
| | | | jER ® 1001 | | 70 | 55 | 40 |
| | | | jER ® 4004P | | | | |
| | | | jER ® 1007 | | | | |
| | | [A3] epoxy resin as represented by general formula (I) | jER ® 154 | 35 | | | |
| | [B] aromatic urea and/or imidazole compound | [B1] aromatic urea | DCMU99 | | | | |
| | | | Omicure 24 | 4 | 4 | 4 | 4 |
| | | [B2] imidazole compound | Curezol ® 2PZ | | | | |
| | | | Cureduct ® P-0505 | | | | |
| | [C] mixture containing borate ester compound | | Cureduct ® L-07N | 3 | 3 | 3 | 3 |
| Resin composition parameter | average epoxy equivalent weight over all epoxy resins g · eq$^{-1}$ | | | 186 | 276 | 209 | 168 |
| | average epoxy equivalent weight of [A2] g · eq$^{-1}$ | | | 316 | 341 | 323 | 299 |
| Physical properties evaluation results | epoxy resin composition | preservation stability (Tg variation ° C.) | | 4 | 4 | 4 | 4 |
| | cured epoxy resin | Tg ° C. | | 133 | 128 | 135 | 142 |
| | | elastic modulus GPa | | 3.5 | 3.3 | 3.5 | 3.7 |
| | | yellowness index | | 78 | 51 | 50 | 74 |
| | woven fabric CFRP | appearance (white spot absent: good, white spot existent: poor) | | good | good | good | good |

TABLE 2

| | | Components | | Example 10 | Example 11 | Example 12 | Example 13 |
|---|---|---|---|---|---|---|---|
| Epoxy resin composition (parts by mass) | [A] epoxy resin | [A1] isocyanurate type epoxy resin | TEPIC ®-S | 20 | | 20 | 20 |
| | | | TEPIC ®-L | | | | |
| | | | TEPIC ®-PAS B22 | | 20 | | |
| | | [A2] bisphenol type epoxy resin | EPICLON ® 830 | | | 40 | 15 |
| | | | jER ® 828 | 25 | 25 | | |
| | | | Epotohto ® YDF2001 | 55 | 55 | | |
| | | | jER ® 1001 | | | 40 | 55 |
| | | | jER ® 4004P | | | | 10 |
| | | | jER ® 1007 | | | | |
| | | [A3] epoxy resin as represented by general formula (I) | jER ® 154 | | | | |
| | [B] aromatic urea and/or imidazole compound | [B1] aromatic urea | DCMU99 | | | | |
| | | | Omicure 24 | 4 | 4 | 4 | 4 |
| | | [B2] imidazole compound | Curezol ® 2PZ | | | | |
| | | | Cureduct ® P-0505 | | | | |
| | [C] mixture containing borate ester compound | | Cureduct ® L-07N | 3 | 3 | 3 | 3 |
| Resin composition parameter | average epoxy equivalent weight over all epoxy resins g · eq$^{-1}$ | | | 223 | 283 | 194 | 242 |
| | average epoxy equivalent weight of [A2] g · eq$^{-1}$ | | | 322 | 322 | 253 | 374 |
| Physical properties evaluation results | epoxy resin composition | preservation stability (Tg variation ° C.) | | 4 | 4 | 4 | 4 |
| | cured epoxy resin | Tg ° C. | | 135 | 133 | 126 | 134 |
| | | elastic modulus GPa | | 3.5 | 3.4 | 3.5 | 3.5 |
| | | yellowness index | | 63 | 66 | 61 | 55 |
| | woven fabric CFRP | appearance (white spot absent: good, white spot existent: poor) | | good | good | good | good |

TABLE 2-continued

| | Components | | | Example 14 | Example 15 | Example 16 | Example 17 |
|---|---|---|---|---|---|---|---|
| Epoxy resin composition (parts by mass) | [A] epoxy resin | [A1] isocyanurate type epoxy resin | TEPIC ®-S | 20 | | | |
| | | | TEPIC ®-L | | | | |
| | | | TEPIC ®-PAS B22 | | | | |
| | | [A2] bisphenol type epoxy resin | EPICLON ® 830 | 15 | | 30 | |
| | | | jER ® 828 | | 22 | | |
| | | | Epotohto ® YDF2001 | | 28 | | |
| | | | jER ® 1001 | 45 | | | |
| | | | jER ® 4004P | | | | |
| | | | jER ® 1007 | 20 | | | 30 |
| | | [A3] epoxy resin as represented by general formula (I) | jER ® 154 | | 50 | 70 | 70 |
| | [B] aromatic urea and/or imidazole compound | [B1] aromatic urea | DCMU99 | | | | |
| | | | Omicure 24 | 4 | 4 | 4 | 4 |
| | | [B2] imidazole compound | Curezol ® 2PZ | | | | |
| | | | Cureduct ® P-0505 | | | | |
| | [C] mixture containing borate ester compound | | Cureduct ® L-07N | 3 | 3 | 3 | 3 |
| Resin composition parameter | average epoxy equivalent weight over all epoxy resins g · eq$^{-1}$ | | | 255 | 219 | 176 | 245 |
| | average epoxy equivalent weight of [A2] g · eq$^{-1}$ | | | 417 | 285 | 172 | 1975 |
| Physical properties evaluation results | epoxy resin composition | preservation stability (Tg variation ° C.) | | 4 | 4 | 4 | 4 |
| | cured epoxy resin | Tg ° C. | | 124 | 125 | 124 | 126 |
| | | elastic modulus GPa | | 3.5 | 3.4 | 3.6 | 3.6 |
| | | yellowness index | | 41 | 52 | 69 | 53 |
| | woven fabric CFRP | appearance (white spot absent: good, white spot existent: poor) | | good | good | good | good |

TABLE 3

| | Components | | | Example 18 | Example 19 | Example 20 |
|---|---|---|---|---|---|---|
| Epoxy resin composition (parts by mass) | [A] epoxy resin | [A1] isocyanurate type epoxy resin | TEPIC ®-S | 30 | 30 | 30 |
| | | | TEPIC ®-L | | | |
| | | | TEPIC ®-PAS B22 | | | |
| | | [A2] bisphenol type epoxy resin | EPICLON ® 830 | | | |
| | | | jER ® 828 | 25 | 25 | 25 |
| | | | Epotohto ® YDF2001 | 45 | 45 | 45 |
| | | | jER ® 1001 | | | |
| | | | jER ® 4004P | | | |
| | | | jER ® 1007 | | | |
| | | [A3] epoxy resin as represented by general formula (I) | jER ® 154 | | | |
| | [B] aromatic urea and/or imidazole compound | [B1] aromatic urea | DCMU99 | | | |
| | | | Omicure 24 | 2 | 4 | 8 |
| | | [B2] imidazole compound | Curezol ® 2PZ | | | |
| | | | Cureduct ® P-0505 | | | |
| | [C] mixture containing borate ester compound | | Cureduct ® L-07N | 3 | 3 | 3 |
| Resin composition parameter | average epoxy equivalent weight over all epoxy resins g · eq$^{-1}$ | | | 190 | 190 | 190 |
| | average epoxy equivalent weight of [A2] g · eq$^{-1}$ | | | 308 | 308 | 308 |
| Physical properties evaluation results | epoxy resin composition | preservation stability (Tg variation ° C.) | | 1 | 4 | 7 |
| | cured epoxy resin | Tg ° C. | | 126 | 136 | 143 |
| | | elastic modulus GPa | | 3.5 | 3.5 | 3.5 |
| | | yellowness index | | 39 | 52 | 74 |
| | woven fabric CFRP | appearance (white spot absent: good, white spot existent: poor) | | good | good | good |

| | Components | | | Example 21 | Example 22 | Example 23 |
|---|---|---|---|---|---|---|
| Epoxy resin composition (parts by mass) | [A] epoxy resin | [A1] isocyanurate type epoxy resin | TEPIC ®-S | 20 | 20 | |
| | | | TEPIC ®-L | | | 20 |
| | | | TEPIC ®-PAS B22 | | | |
| | | [A2] bisphenol type epoxy resin | EPICLON ® 830 | | | |
| | | | jER ® 828 | 25 | 25 | 25 |
| | | | Epotohto ® YDF2001 | 55 | 55 | 55 |
| | | | jER ® 1001 | | | |
| | | | jER ® 4004P | | | |
| | | | jER ® 1007 | | | |

TABLE 3-continued

| | | | | | | |
|---|---|---|---|---|---|---|
| | | [A3] epoxy resin as represented by general formula (I) | jER ® 154 | | | |
| | [B] aromatic urea and/or imidazole compound | [B1] aromatic urea | DCMU99 Omicure 24 | 1 | 4 | 3 |
| | | [B2] imidazole compound | Curezol ® 2PZ Cureduct ® P-0505 | 1 | 4 | 2 |
| | | [C] mixture containing borate ester compound | Cureduct ® L-07N | 3 | 3 | 3 |
| Resin composition parameter | average epoxy equivalent weight over all epoxy resins g · eq$^{-1}$ | | | 223 | 223 | 224 |
| | average epoxy equivalent weight of [A2] g · eq$^{-1}$ | | | 322 | 322 | 322 |
| Physical properties evaluation results | epoxy resin composition | preservation stability (Tg variation ° C.) | | 1 | 7 | 5 |
| | cured epoxy resin | Tg ° C. | | 126 | 143 | 146 |
| | | elastic modulus GPa | | 3.5 | 3.5 | 3.5 |
| | | yellowness index | | 58 | 71 | 72 |
| | woven fabric CFRP | appearance (white spot absent: good, white spot existent: poor) | | good | good | good |

TABLE 4

| | | | Components | Comparative example 1 | Comparative example 2 | Comparative example 3 |
|---|---|---|---|---|---|---|
| Epoxy resin composition (parts by mass) | [A] epoxy resin | [A1] isocyanurate type epoxy resin | TEPIC ®-L | 20 | 20 | |
| | | [A2] bisphenol type epoxy resin | EPICLON ® 830 jER ® 828 Epotohto ® YDF2001 jER ® 1001 jER ® 1007 | 10 22 | 10 22 | 31 69 |
| | | [A3] epoxy resin as represented by general formula (I) | jER ® 154 | 48 | 48 | |
| | | [A4] other epoxy resin | SUMI-EPOXY ® ELM434 | | | |
| | [B] aromatic urea and/or imidazole compound | [B1] aromatic urea | DCMU99 Omicure 24 | 4 | 4 | 4 |
| | | [B'] other curing agent | jERCure ® DICY7 | | | |
| | | [C] mixture containing borate ester compound | Cureduct ® L-07N | 3 | | 3 |
| Resin composition parameter | average epoxy equivalent weight over all epoxy resins g · eq$^{-1}$ | | | 176 | 176 | 323 |
| | average epoxy equivalent weight of [A2] g · eq$^{-1}$ | | | 322 | 322 | 323 |
| Physical properties evaluation results | epoxy resin composition | preservation stability (Tg variation ° C.) | | 4 | 11 | 4 |
| | cured epoxy resin | Tg ° C. | | 133 | 136 | 120 |
| | | elastic modulus GPa | | 3.6 | 3.6 | 3 |
| | | yellowness index | | 106 | 101 | 31 |
| | woven fabric CFRP | appearance (white spot absent: good, white spot existent: poor) | | good | good | good |
| | | | Components | Comparative example 4 | Comparative example 5 | Comparative example 6 |
| Epoxy resin composition (parts by mass) | [A] epoxy resin | [A1] isocyanurate type epoxy resin | TEPIC ®-L | | | 50 |
| | | [A2] bisphenol type epoxy resin | EPICLON ® 830 jER ® 828 Epotohto ® YDF2001 jER ® 1001 jER ® 1007 | 25 55 | 25 55 | 20 30 |
| | | [A3] epoxy resin as represented by general formula (I) | jER ® 154 | 20 | | |
| | | [A4] other epoxy resin | SUMI-EPOXY ® ELM434 | | 20 | |

TABLE 4-continued

|  |  |  | | | | |
|---|---|---|---|---|---|---|
| | [B] aromatic urea and/or imidazole compound | [B1] aromatic urea | DCMU99 | | | |
| | | | Omicure 24 | 4 | 4 | 4 |
| | | [B'] other curing agent | jERCure ® DICY7 | | | |
| | | [C] mixture containing borate ester compound | Cureduct ® L-07N | 3 | 3 | 3 |
| Resin composition parameter | average epoxy equivalent weight over all epoxy resins g · eq⁻¹ | | | 277 | 241 | 148 |
| | average epoxy equivalent weight of [A2] g · eq⁻¹ | | | 322 | 322 | 279 |
| Physical properties evaluation results | epoxy resin composition | preservation stability (Tg variation ° C.) | | 4 | 4 | 4 |
| | cured epoxy resin | Tg ° C. | | 125 | 127 | 135 |
| | | elastic modulus GPa | | 3.1 | 3.1 | 3.7 |
| | | yellowness index | | 78 | 109 | 115 |
| | woven fabric CFRP | appearance (white spot absent: good, white spot existent: poor) | | good | good | good |

TABLE 5

| | | | Components | Comparative example 7 | Comparative example 8 | Comparative example 9 | Comparative example 10 |
|---|---|---|---|---|---|---|---|
| Epoxy resin composition (parts by mass) | [A] epoxy resin | [A1] isocyanurate type epoxy resin | TEPIC ®-L | 20 | 20 | | |
| | | [A2] bisphenol type epoxy resin | EPICLON ® 830 | 80 | 20 | 30 | |
| | | | jER ® 828 | | | | |
| | | | Epotohto ® YDF2001 | | | 30 | |
| | | | jER ® 1001 | | | | |
| | | | jER ® 1007 | | 60 | | |
| | | [A3] epoxy resin as represented by general formula (I) | jER ® 154 | | | 40 | 50 |
| | | [A4] other epoxy resin | SUMI-EPOXY ® ELM434 | | | | 50 |
| | [B] aromatic urea and/or imidazole compound | [B1] aromatic urea | DCMU99 | | | | |
| | | | Omicure 24 | 4 | 4 | 4 | 4 |
| | | [B'] other curing agent | jERCure ® DICY7 | | | | |
| | | [C] mixture containing borate ester compound | Cureduct ® L-07N | 3 | 3 | 3 | 3 |
| | | [C'] other acidic compound | benzoic acid | | | | |
| Resin composition parameter | average epoxy equivalent weight over all epoxy resins g · eq⁻¹ | | | 151 | 290 | 216 | 143 |
| | average epoxy equivalent weight of [A2] g · eq⁻¹ | | | 172 | 545 | 253 | — |
| Physical properties evaluation results | epoxy resin composition | preservation stability (Tg variation ° C.) | | 4 | 4 | 4 | 4 |
| | cured epoxy resin | Tg ° C. | | 103 | 107 | 120 | 105 |
| | | elastic modulus GPa | | 3.5 | 3.5 | 3.1 | 3.5 |
| | | yellowness index | | 77 | 39 | 51 | 104 |
| | woven fabric CFRP | appearance (white spot absent: good, white spot existent: poor) | | good | good | good | good |

| | | | Components | Comparative example 11 | Comparative example 12 | Comparative example 13 |
|---|---|---|---|---|---|---|---|
| Epoxy resin composition (parts by mass) | [A] epoxy resin | [A1] isocyanurate type epoxy resin | TEPIC ®-L | | 20 | |
| | | [A2] bisphenol type epoxy resin | EPICLON ® 830 | | | |
| | | | jER ® 828 | | 25 | |
| | | | Epotohto ® YDF2001 | | 55 | 30 |
| | | | jER ® 1001 | | | |
| | | | jER ® 1007 | 50 | | |

TABLE 5-continued

|  |  |  |  |  |  |
|---|---|---|---|---|---|
|  |  | [A3] epoxy resin as represented by general formula (I) | jER ® 154 | 50 | 70 |
|  |  | [A4] other epoxy resin | SUMI-EPOXY ® ELM434 |  |  |
|  | [B] aromatic urea and/or imidazole compound | [B1] aromatic urea | DCMU99 |  | 3.0 |
|  |  |  | Omicure 24 | 4 | 4 |
|  |  | [B'] other curing agent | jERCure ® DICY7 |  | 6 |
|  |  | [C] mixture containing borate ester compound | Cureduct ® L-07N | 3 |  |
|  |  | [C'] other acidic compound | benzoic acid |  |  |
| Resin composition parameter | average epoxy equivalent weight over all epoxy resins g·eq⁻¹ |  |  | 327 | 224 | 219 |
|  | average epoxy equivalent weight of [A2] g·eq⁻¹ |  |  | 1975 | 322 | 475 |
| Physical properties evaluation results | epoxy resin composition | preservation stability (Tg variation ° C.) |  | 4 | 4 | 10 |
|  | cured epoxy resin | Tg ° C. |  | 111 | 134 | 130 |
|  |  | elastic modulus GPa |  | 3.4 | 3.5 | 3.6 |
|  |  | yellowness index |  | 48 | 54 | 68 |
|  | woven fabric CFRP | appearance (white spot absent: good, white spot existent: poor) |  | poor | good | good |

The epoxy resin composition according to the present invention serves to produce a cured epoxy resin that simultaneously realizes a high heat resistance, a high elastic modulus, and a low color and therefore, fiber reinforced composite materials containing this as matrix resin have a high heat resistance, good mechanical properties, and a low color. Furthermore, molded articles produced from such fiber reinforced composite materials do not suffer the formation of white spots on the surface thereof, and this feature, in combined with their low color feature, can ensure high designability. The epoxy resin composition, prepreg, and fiber reinforced composite material according to the present invention can be applied favorably to sport applications and general industrial applications.

The invention claimed is:

1. An epoxy resin composition comprising an epoxy resin as component [A], at least one of an aromatic urea [B1] or an imidazole compound [B2] as component [B], and a borate ester compound as component [C], containing dicyandiamide in an amount of 0.5 part by mass or less relative to the total quantity of epoxy resins, which accounts for 100 parts by mass,
wherein an epoxy resin [A3] as represented by general formula (I) is contained as component [A] in an amount of 50 to 100 parts by mass relative to the total quantity of epoxy resins which represents 100 parts by mass,

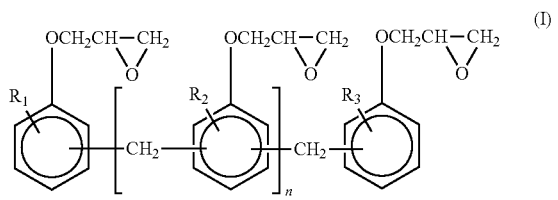

(I)

wherein $R_1$, $R_2$, and $R_3$ are each a hydrogen atom or a methyl group, and n is an integer of 1 or more, and
wherein the average epoxy equivalent weight over all epoxy resins is 165 to 265 g/eq.

2. An epoxy resin composition as set forth in claim 1 wherein dicyandiamide accounts for 0.2 part by mass or less relative to the total quantity of epoxy resins which accounts for 100 parts by mass.

3. An epoxy resin composition as set forth in claim 1 wherein dicyandiamide is not contained in the epoxy resin composition.

4. An epoxy resin composition as set forth in claim 1 wherein substantially only aromatic urea [B1] is contained as component [B] and [B1] accounts for 2.5 to 7.5 parts by mass relative to the total quantity of epoxy resins which accounts for 100 parts by mass.

5. An epoxy resin composition as set forth in claim 1 wherein aromatic urea [B1] and imidazole compound [B2] are contained as component [B], [B1] accounting for 0.5 to 5 parts by mass relative to the total quantity of epoxy resins which accounts for 100 parts by mass, [B2] accounting for 0.5 to 5 parts by mass relative to the total quantity of epoxy resins which accounts for 100 parts by mass, and [B1] and [B2] together accounting for 2.5 to 7.5 parts by mass relative to the total quantity of epoxy resins which accounts for 100 parts by mass.

6. An epoxy resin composition as set forth in claim 5 wherein a compound as represented by general formula (II) is contained as [B2]:

[Chemical formula 2]

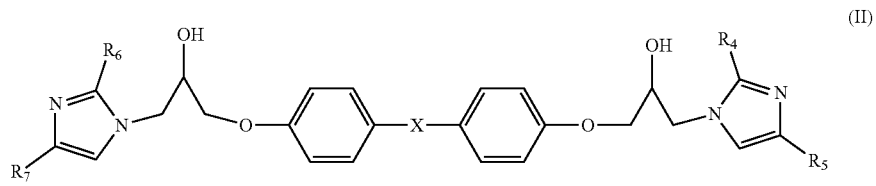

(II)

wherein, $R_4$, $R_5$, $R_6$, and $R_7$ are each independently a hydrogen atom, an aliphatic hydrocarbon group with a carbon number of 1 to 20, or a phenyl group, and X is a single bond, an alkylene group, an alkylidene group, an ether group, or a sulfonyl group.

7. A prepreg comprising an epoxy resin composition as set forth in claim 1 and reinforcing fiber.

8. A prepreg as set forth in claim 7 wherein the reinforcing fiber is in the form of woven fabric.

9. A prepreg as set forth in claim 7 wherein the reinforcing fiber is carbon fiber.

10. A fiber reinforced composite material obtainable by curing a prepreg as set forth in claim 9.

* * * * *